United States Patent [19]

Matz et al.

[11] Patent Number: 4,728,531

[45] Date of Patent: Mar. 1, 1988

[54] METHOD OF DRYING REFRACTORY COATED FOAM PATTERNS

[75] Inventors: Bruno Matz, Milford; Dolores C. Kearney, Inkster, both of Mich.

[73] Assignee: Ford Motor Company, Dearborn, Mich.

[21] Appl. No.: 926,758

[22] Filed: Nov. 4, 1986

[51] Int. Cl.[4] .................. G05D 3/02

[52] U.S. Cl. .................. 427/45.1; 427/134; 427/379; 34/4

[58] Field of Search .................. 427/45.1; 34/13, 4

[56] References Cited

U.S. PATENT DOCUMENTS

| | | | |
|---|---|---|---|
| 3,704,523 | 12/1972 | Guerga et al. | 34/1 |
| 3,732,048 | 5/1973 | Guerga et al. | 425/174.4 |
| 3,850,224 | 11/1974 | Vidmar et al. | 164/4 |
| 3,942,260 | 3/1976 | Nishitani | 34/4 |
| 4,043,380 | 8/1977 | Valentine | 164/41 |
| 4,126,651 | 11/1978 | Valentine | 264/25 |
| 4,180,918 | 1/1980 | Ostrowski | 34/13 |
| 4,535,548 | 8/1985 | Hyde | 34/13 |

*Primary Examiner*—Thurman K. Page
*Assistant Examiner*—L. R. Horne
*Attorney, Agent, or Firm*—Joseph W. Malleck; Roger L. May

[57] ABSTRACT

A method is disclosed of dehydrating a thin water based ceramic slurry coating on a foam pattern assembly having hidden internal surfaces. The method comprises sequentially subjecting the coated assembly to a first warm air flow at a sufficient temperature and time to dehydrate and remove 60–80% of the water of the coating, and secondly subjecting the dehydrated coating assembly to low level microwave energy to substantially remove the remainder of the water in all of the coating, the dehydrated coating being devoid of bubbles or cracking.

The coating is made by use of a slurry comprising a thixotropic silica water suspension with the silica comprising only 40–50% of the slurry; the slurry also may include a small portion of clay and in some cases an acrylic or epoxy glue additive. The pattern assembly or cluster is comprised of a plurality of molding patterns integrally carried by a gating system and common sprue, the patterns being at least four in number and radiating from the common sprue. The patterns may be of a complex nature having tunnels or internal chambers not readily exposed, such as are present in an automotive manifold or head casting pattern.

16 Claims, 4 Drawing Figures

METHOD OF DRYING REFRACTORY COATED FOAM PATTERNS

BACKGROUND OF THE INVENTION

1. Field of the Invention

This invention relates to the art of applying thin refractory coatings to a foam pattern for use in the evaporative casting process, and more particularly to the art of drying said thin refractory coatings with integrity and absence of imperfections.

2. Description of the Prior Art

Recently, the evaporative casting process (ECP) has been commercialized for use in making high volume automotive metal castings. It is a process in which polystyrene beads are expanded and fused to adopt the shape of a pattern mold. Both the product pattern and attendant gating is formed as an integrated unit or assembly. The pattern assembly is suspended within a flask followed by the injection of unbonded sand which is then vibrated to lock the sand grains about the pattern forming a completed mold. Hot molten metal is poured into the flask to thermally displace the polystyrene foam gating and product pattern. The foam is evaporated and its gaseous products migrate outwardly through the interstices of the dry sand.

In making automotive metal castings, many of the patterns are of a complex shape having hidden surfaces requiring that the pattern be formed of multiple parts which are glued together to form the completed pattern. The glue can often times be more heat sensitive than the foam pattern itself during the handling and coating processes. A refractory coating is necessary to improve the surface finish of the metal casting and to act as a temporary gas permeable mold surface.

It is desirable that such refractory coating be applied in a thin mode, typically by dipping the pattern assembly into a water suspension of the refractory particles. The coating thickness cannot be greater than ⅛ inch if such coating is to function as a porous temporary mold form. To maintain such thin coating, it is important that the aqueous suspension have a high water content; as much as 2 kilograms of water may be evaporated from each coated pattern. The water must be removed not only from the easily accessible outer surface of the pattern but also from the hidden under surfaces of a complex pattern. Use of heat to dry the thin coating cannot be used in an uncontrolled manner because the foam and glue joints are heat sensitive. Cool or warm air with or without microwave heating has been explored by the prior art.

Microwave energy coupled with flowing cool air, or simply flowing air by itself, has been used to dry relatively thick bodies of refractory material. In such cases, high levels of energy have been used because of the thickness of the body and the need for removal of a high amount of water. In U.S. Pat. Nos. 3,704,523 and 3,732,048, microwave energy was applied to wet molded ceramic objects with the simultaneous application of cool room temperature air over the mold. This early use of microwave energy in combination with a cool flow of air required an exorbitant amount of time to dry such object.

In U.S. Pat. Nos. 4,126,651, and 4,043,380, microwave energy was used in two stages to heat a solid plaster mold core to an internal temperature of about 300° F., a temperature higher than the microwave heating temperatures (about 150° F.) of the above discussed patents. Heating stages were separated by a room temperature air blowing step. The first stage of microwave energy heating caused the water in the thick plaster body to migrate to the surface, and the second stage drove the surface water away by evaporation. This method is inapplicable to solving the problem of flawlessly drying a thin refractory water coating on a heat sensitive foam pattern; it heats the body indiscriminantly to too high a temperature. The high water content of the plaster mold attracts so much microwave energy, even at lowered power levels, that the use of such method on a thin coating causes bubbles, cracks and the steam, resulting from such heating, melts foam and glue. To lower the power level, to reduce the heating temperature, would oxorbitantly increase the amount of time required for the drying procedure.

In U.S. Pat. No. 3,942,260, a thick refractory lining for a tundish or similar vessel was heated by microwave energy along with a simultaneous hot blast of air at a temperature of 300°–400° F. Again, the temperature attained would be destructive to the drying of a thin coating on a heat sensitive substrate.

A series of thin refractory coatings on shell molds have been used. In U.S. Pat. No. 3,850,224, only air drying was employed for each coating of the series, the air being applied at impact rates of 1000 feet per minute. Of course, such air drying at high impact rates would be destructive of the sensitive foam substrates under consideration here. In U.S. Pat. No. 4,180,918, the use of intermittent microwave energy along with cooling air at a temperature of about 55° F. was employed to dry the multiple refractory layers for building up a shell mold on a wax pattern. Energy was applied for periods of about one minute, thus requiring a total time of about 5–6 minutes for each layer. There is no assurance that the use of this combination of intermittent microwave energy and cool air would in any way result in rapid production line cooling of a high water content thin coating for a foam pattern.

All of the above prior art fails to provide staged dehydration that can be carried out in a shortened period of time without harming the supporting foam pattern.

SUMMARY OF THE INVENTION

Figures 1, 2:
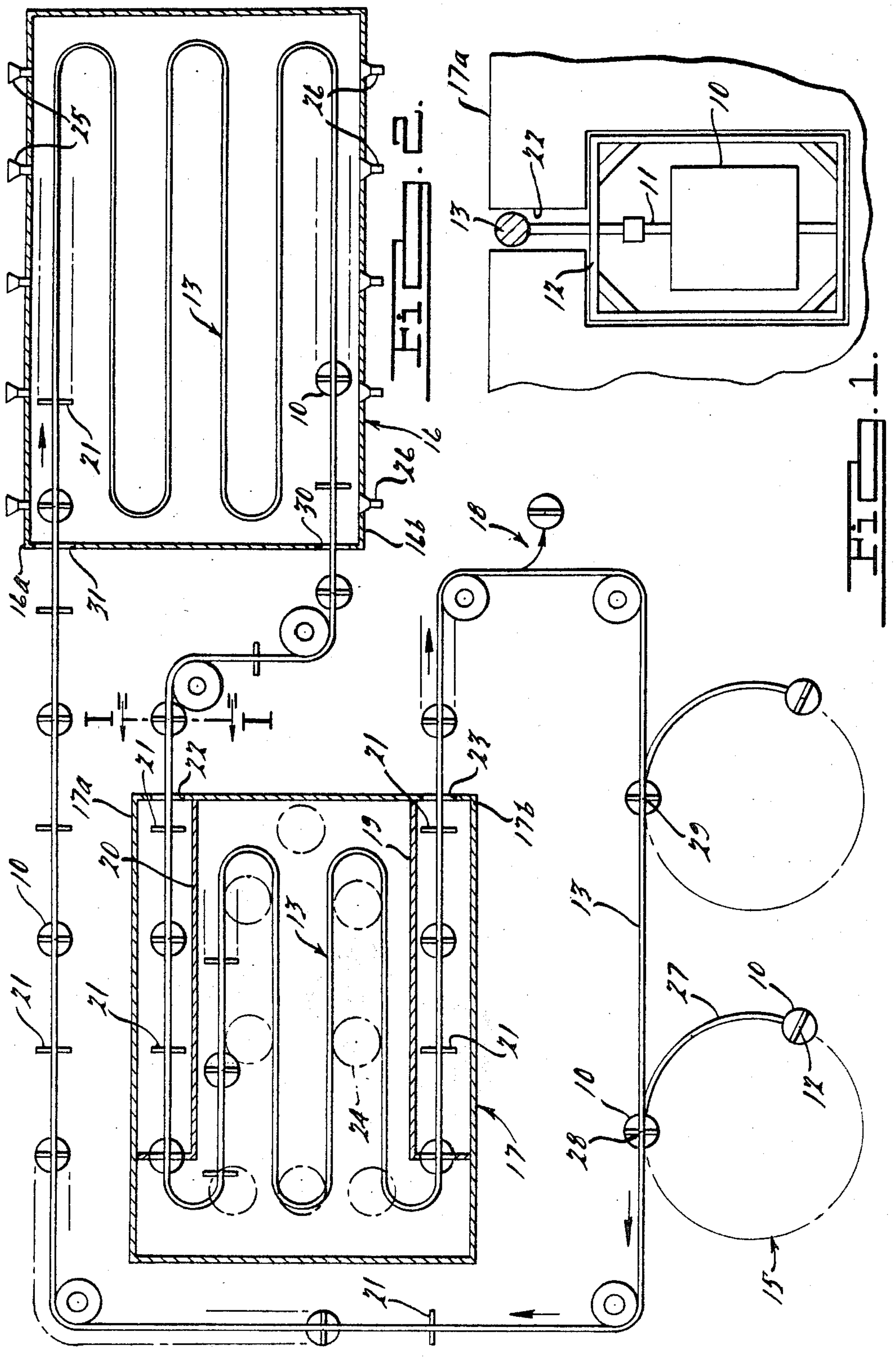
FIG. 1 is an elevational view of a clustered patterns, coated with refractory slurry, hung on a conveyor frame and is illustrated in a position where it enters the microwave oven.
FIG. 2 is a schematic layout of the conveyor system and ovens illustrating the path through which the cluster of patterns move.

It is a general object of this invention to substantially fully dehydrate a relatively thin water coating of refractory slurry material on a consumable foam pattern in a time period of less than two hours without harming the pattern or coating. More particularly, it is an object of this invention to achieve such expeditious dehydration for a water coating that is thixotropic and which coating is supported by a pattern that is of a complex nature having hidden surfaces and multiple parts glued together. The resulting dehydrated coating should be smooth, free of bubbling, have no scorching or browning, and the underlying pattern should have no flaking or separation of the pattern or glue joint.

The method of this invention which achieves the above objects comprises sequentially subjecting a coating assembly to a first warm air flow at a sufficient temperature and time to dehydrate and remove 60–80% of the water of the coating, and secondly subjecting the dehydrated coating assembly to low level microwave energy to substantially remove the remainder of the water in the coating, said dehydrated coating being devoid of bubbles or cracking.

The coating is preferably made by use of a slurry comprising a silica water suspension with the silica comprising only 40–50% of the slurry; the slurry also preferably includes a small portion of clay to impart thixotropic properties and, in some cases, an acrylic or epoxy glue additive. The coating is preferably 1/32–⅛ inch in thickness and has a thickness gradient resulting not only from the thixotropic character of the slurry but from the manner of coating such as by dipping.

The pattern is preferably comprised of a polystyrene foam which is easily consumable upon contact with molten metal. A pattern assembly or cluster is preferably comprised of a plurality of molding patterns integrally carried by a gating system and common sprue, the patterns being at least four in number and radiating from the common sprue. The patterns may be of a complex nature having tunnels or internal chambers not readily exposed, such as present in an automotive manifold or head casting pattern.

Preferably the first step is carried out at a temperature in the range of 120°–160° F. for a period of time of 50–90 minutes with a warm airflow at a rate in the range of 30,000–50,000 cfm, depending upon the number of wet coated pattern assemblies contained within the oven enclosure.

Preferably the second step uses a microwave energy power level, of low concentration, advantageously one kilowatt per 64 cubic feet of space within the oven, or 0.9–2.0 kilowatts per pattern cluster. Preferably the time at which the coated assembly is exposed to the microwave energy is in a range of 6–15 minutes.

Advantageously, the first step is carried out to a degree of dehydration so that there is no greater than 0.4 pounds of water per coated assembly prior to the microwave energy treatment.

DETAILED DESCRIPTION AND BEST MODE

The method comprises essentially two steps. The first step is that of subjecting a foam pattern assembly, thinly coated with a water based ceramic slurry, to a first warm air flow at a sufficient temperature and time to dehydrate and remove 60–80% of the water of the coating or to leave no greater than 0.4 pounds of water per coated assembly. The second step comprises subjecting the previously dehydrated coating assembly to low level microwave energy to substantially remove the remainder of the moisture in the coating.

STARTING MATERIALS

A foam pattern for which the invention described herein is particularly useful is comprised of a polystyrene foamed material or equivalent plastic foam, as more fully described in copending U.S. application Ser. No. 926,754, the disclosure of which is incorporated herein. Such foam pattern is now used in commercial production for making automotive castings, such as manifolds or aluminum or iron heads, and in some cases has been experimentally used for making engine blocks. Each of these types of castings are complex in nature and have underlying internal surfaces. The patterns have been split into portions to accurately define such internal surfaces, the portions then being glued together along either planar glue planes or other devised parting surfaces for the glue joint. In a head pattern, there is a tunnel or large internal chamber which is not readily exposed to air flow around the outside of the head pattern and therefore is not readily air dried as would be the case with the exterior surfaces.

A water based ceramic slurry comprised of 40–50% silica, and the remainder water was used for the slurry coating; however, slurries can also be comprised of zirconium silicate ($ZrSiO_4$) or olivines [$(Mg\text{-}Fe)_2 2SiO_4$ or $(Mg\text{-}Fe\text{-}Mn\text{-}Cu)_2 2SiO_4$] in similar amounts. The particle size of the silica used for such slurry has about 72% in the 2–10 micron range with 14% above 10 microns and 14% below one micron. Depending on the particular qualities desired of the refractory coating, materials such as $Al_2O_3$, clay fines, and/or acrylic or epoxy may be added to the slurry to vary insulating properties, control permeability, or enhance the binding. The water content of these varied slurries will remain the same, about 50–60%. Clay, particularly, permits the slurry to be very thin while being mixed but jells when attached to a substrate after having been dipped in the slurry solution, commonly referred to as a thixotropic property. Such a thixotropic slurry will settle in some locations in a thickness of about ⅛ inch and will coat at other locations at thickness of about 1/16 inch. Such coating creates a slightly variable thickness gradient.

Both the foam pattern and the water based ceramic slurry coating are transparent to microwaves, that is they are considered as lossy material.

DRYING EQUIPMENT

Two ovens are employed: warm air flow oven 16 and a microwave oven 17. As each foam pattern cluster 10 is unloaded from a dipping machine 15, it is hung by way of a common sprue 11 on a frame 12 which in turn is moved along a track 13 of a continuously moving overhead monorail conveyor system to dry in the ovens. When dry, the clusters are transferred at station 18 for movement to a casting line (not shown). No part float is provided other than the in-process drying clusters.

To produce a quality casting, a foam cluster must emerge from the drying process with a smooth, evenly coating exterior and interior, be 100% dry in all areas including elimination of any moisture in the internal hidden pockets where air flow is very difficult to reach, and have no cracking or brittleness, no scorching or browning of the refractory caused by drying too fast at too high a temperature, and possess integrity of the glue joint in the foam surface unaffected by flaking or separation.

The requirement, placed upon this method, that the total dehydration time be two hours or less, is desirable of high production casting systems. To achieve this high productivity with no storage time between the refractory coating (dipping machine 15) and the casting line, requires the use of the overhead monorail conveyor 13 to transport the wet pattern clusters from the refractory dip machine 15 through the two stage drying system. The conveyor 13 has hangers or frames 12 which are designed to hold a variety of part configurations.

The warm air flow oven 16 is heated by gas; the warm air is circulated into the oven by fans 25 stationed along one side and wet air is exhausted at exits 26 stationed along the other side of the oven. The oven can be a simple enclosure with the monorail conveyor entering at corner 16*a* following a serpentine path therethrough to allow for a time dwell therein of about one hour, and for some unusual pattern designs, up to 1½ hours while traveling a speed of 180 clusters per hour. The clusters exit at corner 16*b*.

The microwave oven incorporates several features: an overhead monorail conveyor chain 13, and metal hangers or frames 12 must pass through it; the conveyor 13 has to move continuously, no batching or indexing because of the high production level; the microwave power concentration at any location in the oven could not exceed the limit where the refractory or foam would be damaged; it must contain the microwave energy to be safe for the workers while being continuous.

This invention establishes that to dry a complex part with a quality coating requires a low microwave energy concentration. Using production conveyor speeds with the hangers 12 on three foot centers along the conveyor, the microwave oven size and total amount of water removal was determined and ranged from 0–0.5 kilogram per cluster or foam pattern assembly. Lastly, the total microwave power requirements must be established to duplicate the necessary low energy concentration in an oven that holds approximately 40–60 clusters on their hangers, all at different stages of dryness.

Since the drying conveyor is continuous, the microwave oven 17 is designed with entrance and exit tunnels 19–20 to trap microwave energy and the entrance 22 at oven corner 17*a* and exit 23 at oven corner 17*b* are each slotted to accept the pheripheral shape of the hanger (see FIG. 1). On the conveyor between every four clusters is a microwave baffle 21. The baffles are positioned to ensure that two of them are always within each of the exit and entrance tunnels, blocking all stray microwaves. Leakage readings taken at the entrance 22 and exit 23 verified adherance to the requirements of a one milowatt/$cm^2$ maximum. The baffles 21 are aluminum plates surrounded by a pin suppression system disclosed in U.S. Pat. No. 4,182,946. These pins are perpendicular to the microwave leakage and arranged in rows and columns with uniform spacing at ¼ wavelengths to effect a trap. A shielding system was used inside the oven 17 so that the microwaves would be attracted to the more lossy material, namely, the water, so the conveyor could be placed inside.

The oven 17 has eight 6-kilowatt generators feeding the microwave energy via wave guide sections 24 through the oven roof. The conveyor 13 enters one corner 17*a* of the oven and exits the adjacent corner 17*b* after making five 180° bends between six straight runs. Two of the straight runs in line with the exit and entrance suppression tunnels received no direct microwave energy, only that which may bounce and/or be reflected from the aluminum interior of the oven. The addition of the suppression tunnels increased the total number of hangers in the oven at one time to 77, with 51 being under direct microwave action. All eight of the generators were capable of being set from 10 to 100 percent of their power level, and when parts to be run had only small amounts of water to be removed, the energy level was easily changed from one central control panel (not shown).

DRYING TREATMENT

The assembly 10 is prepared by being dipped into a bath of the water based ceramic slurry, the bath containing clay and glue additives in minor proportions to give it a thixotropic characteristic so that it would be very thin and fluid in its mixed condition but assume a gelling characteristic upon contact with the substrate when it is put into the bath. The assembly 10, when dipped and withdrawn, will have a clinging coating which will vary in thickness from 1/32 to ⅛ inch, the thicker portions being in lower regions. The dipping process can be carried out on a production basis with a dipping machine 15 having an auxiliary monorail 27 carrying the pattern clusters to the main conveyor 13 for transfer at locations 28–29.

The first, of two sequential steps, subjects the coated assembly to a first mass airflow at a sufficient temperature and for a time to dehydrate and remove 60–80% of the water of the wet coating, leaving no greater than 0.4 pounds of water per coated assembly. The temperature at which the convective flow of air is controlled at its upper limit to be slightly below the temperature at which the substrate, including both the foam pattern and the glue joints, are destroyed. In the case of polystyrene foam utilized for evaporative casting techniques, such temperature is at a threshold of about 160° F. It is desirable to stay at a warm air temperature as close to such threshold temperature (such as in the range of 120°–160° F.) to maximize the effect of dehydration. It is important, of course, that such temperature be selected so that there be no bubbling or steaming created as a result of the heat effect upon the internal moisture. At such threshold temperature, such consideration is avoided.

The time at which the coated assembly is subjected to such mass airflow depends upon the ability to remove a minimum of 80% of the water content of the coating. Typically, when using an oven having a volume content of 3000 cubic feet and a warm airflow temperature of 155° F., the time period to remove the 80% moisture content from a column of coated foam clusters numbering about 50 within the oven chamber will be approximately 55–60 minutes. The airflow itself should be moderately rapid so that it achieves oven airflow changes every seven times per minute. This may result in an airflow rate across the most conveniently exposed surface of the coated substrate at a velocity of about 200 feet per minute.

The second step is typically carried out as close as possible to the completion of the first step. Some time lapse, required for transferring the partially dehydrated pattern assemblies to the microwave oven will be experienced. The coated patterns are subjected to microwave energy at a low level designed to be within the range of about 0.9–2.0 kilowatts per 64 cubic feet of microwave oven space. When the energy level is kept at such a low level, bubbling and destruction of the foam substrate is avoided. As a rule of thumb, it is also been found that with specific types of intricate pattern clusters the energy level has been calculated to be about 1.4–2.0 kilowatts. But since the pattern shapes and configurations can vary widely, an energy density geared to a pattern configuration has less significance for purposes of future applications.

The coated patterns are carried through the microwave oven facility with a time dwell of 6–15 minutes depending on the part configuration and upon the specific microwave density level employed. The microwaves are capable of reaching the internal trapped moisture that has not been removed by the warm air treatment since the pattern, glue and silica coating are transparent or nonlossy to the microwave energy. It is the water molecules that are trapped therein, which are highly attractive to the microwave energy.

EXAMPLES

Several method trials were undertaken to determine the desirability of different modes of dehydration. The testing program investigated alternative drying systems and compared them to this invention. For these tests, the water loss was indicated by the weight change; when the weight stabilized the part was considered dry. The test procedure consisted of weighing the dry foam cluster, weighing the wetted coated cluster, and weighing, quickly, to prevent heat loss, at appropriate intervals throughout the drying cycle. The part was weighed to four significant figures by electronic balance and considered dry when no further weight change occurred, such as after two consecutive weight readings were the same. The parts were then cut open and visually inspected at the internal passages. Damp areas were readily detected by a darker color, similar to putting drops of water on a colored blotter. The data was recorded and entered into the computer. The program plotted the percent dry versus time of all the various coatings and ovens that were tested. From this data the fastest drying method that gave the best quality part at the lowest capital cost was corroborated.

First, ambient air drying was investigated. A refractory coating with an alcohol vehicle (instead of water) was chosen because it would dry faster due to the low vapor pressure of alcohol. However, while the alcohol did initially dry faster, the total drying time at ambient laboratory temperature was comparable to a water based formula. This may be due to the pattern cluster configuration causing the alcohol saturated air to be trapped inside small passages of the cluster configuration.

Secondly, high velocity warm air ovens were tested with a complex cluster configuration and several coating formulations. It was shown that the exteriors dried quickly, but because of the part cluster orientation on the downsprue airflow was restricted in the small passages. It took typically four hours before water loss ceased, an extremely exorbitant long period of time. Test results showed that in warm ovens, a high percentage of the water loss (the measurement used to determine a dry part) occurred in the first part of the total drying time. It was the small remaining fraction of water that used the majority of time in the oven to complete the drying. Because this small remaining moisture is concentrated usually in one internal area, it causes casting defect problems that might not occur if this moisture were uniformly distributed over the entire pattern surface. When higher air temperatures, above 160° F. (71° C.), were tested, the result was glue separation, scorched, brittle refractory, and shrunk beady surfaced foams under the refractory.

Thirdly, dielectric industrial ovens were tested for possible use since both the expanded polystyrene patterns and the silica refractory are transparent to radio frequency energy generated in dielectric as well as microwave ovens. However, dielectric energy is polarized and perpendicular to the energy source; the parts and/or energy source must be movable to reach all interstices of the part clusters. Blistering, resulting from boiling off the water, was encountered and stem melted the glue. Shadowed pockets were still wet and the parts had to be rotated a calculated distance from the energy source to reach the damp areas, which is undesirable from a manufacturing standpoint. It would appear that the oven must have intricate and sophisticated controls to operate at different levels suited to the particular part being dried.

Fourthly, microwave ovens were tested. In theory the results should predictably be very favorable since the process involves all the correct materials; a transparent foam, transparent glue, and transparent silica refractory coatings. However, all microwave trials were unsuccessful because the high dielectric loss factor of the water and wet coating attracted so much microwave energy that the coatings bubbled and cracked and the steam melted the foam and glue. The power levels were reduced significantly to eliminate the boiling of the water, but the time required was too long to make microwave drying economically feasible. In fact, the capital investment had to be doubled over that required for this invention to provide the temperature indexing and intricate control required for levels of microwave energy as the part reached progressive stages of drying.

Figure 3:
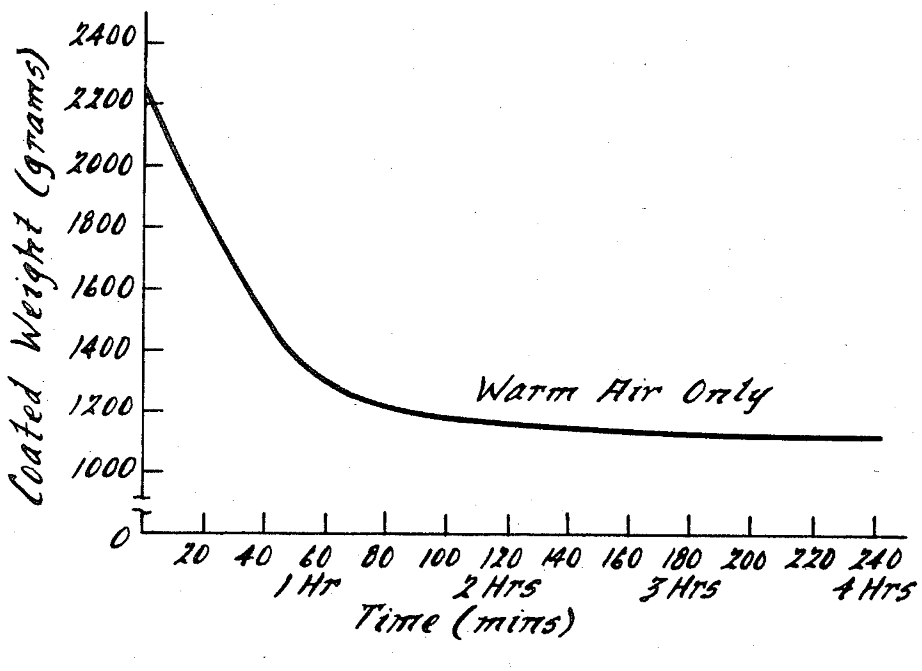
FIG. 3 is a graphical illustration plotting coated weight of the pattern versus heating time for warm air dehydration.
Figure 4:
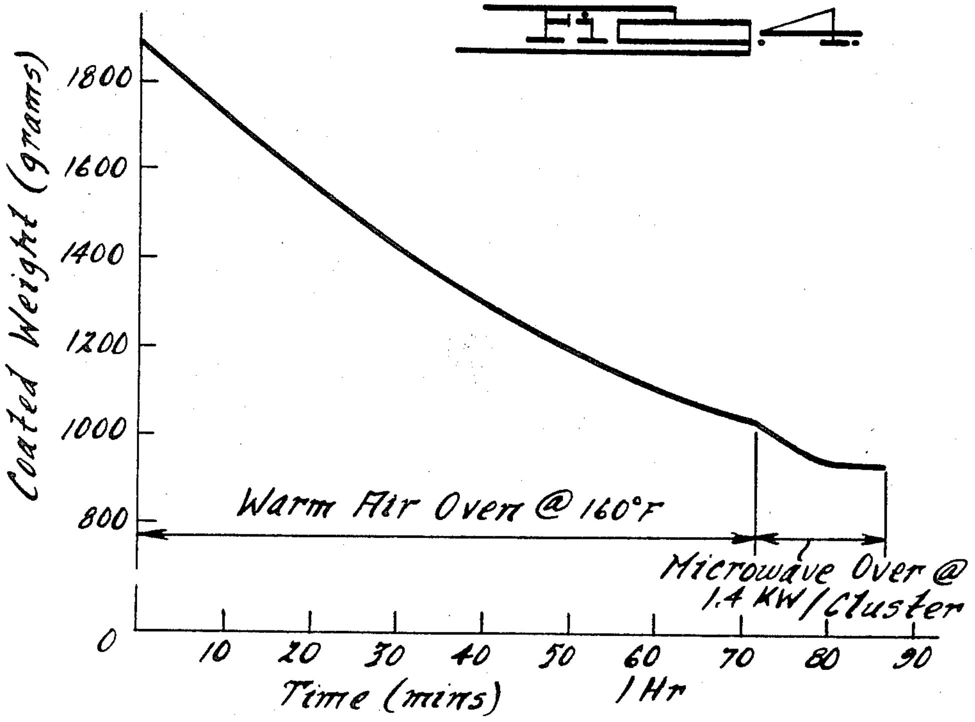
FIG. 4 is a graphical illustration of coated pattern weight versus heating time illustrating the combined effects of both warm air pretreatment and microwave heating.

Lastly, the method of this invention using staged warm air and microwaves was tested in a series of trials (the patterns were first dried by warm air to 80% and then to 100% by microwave). For the warm air drying the tests discovered that wed coated parts were at least 80% dried in only 20% of the total drying time of 4 hours, using warm air (see FIG. 3). Each trial was conducted in a small microwave oven with variable power control so that the energy concentration could be adjusted in fractions of kilowatts and then related to water loss and time. It was important to establish the upper limits for microwave concentration to avoid any blistering or boiling. The test procedure consisted of drying one cluster at a time for the worst case part configuration in a 64 cubic feet test oven at 1.4 kilowatts per cluster. The results, as shown in FIG. 4, illustrate that the microwave drying stage took only 20 minutes to achieve total dehydration without harm to the pattern. This condition simulated the microwave density in the production oven at 48 kilowatts or eight microwave generators of 6 kilowatts each. Trial tests were also done to simulate the lower kilowatt level from six generators as well as simulations of 10 and 12 generators which would produce higher power levels. The tests verified that a production style microwave oven would have the capability to dry clusters to 100% dry when 182 grams of water remained after warm air drying. Tests also indicated that at the 2.4 kilowatt level, which is equivalent to 13 generators, the microwave concentration was too high and caused cracking and bubbling. The results of running the oven at 100% power with all the hangers empty revealed no problems. However, to conserve energy, there is an automatic generator shutdown system based on cluster count obtained by electronic reading at the oven entrance.

While particular embodiments of the invention have been illustrated and described, it will be obvious to those skilled in the art that various changes and modifications may be made without departing from the invention, and it is intended to cover in the appended claims all such changes and modifications as fall within the true spirit and scope of the invention.

We claim:

1. A method of dehydrating polystyrene foam pattern assemblies coated with a water based ceramic slurry in a thickness range of 0.031–0.120 inches, said pattern assemblies having hidden internal surfaces, the method comprising:

(a) subjecting said coated assembly to a single cycle of convective airflow at a temperature and time sufficient to dehydrate at least 80% of the vaporizable content of said coating at a temperature below that at which the substrate is thermally affected; and (b) thereafter subjecting said partially dehydrated coated assembly to microwave energy to substantially remove the remainder of said vaporizable content in the coating in a manner to avoid nonuniformity in the smoothness of the coating.

2. The method as in claim 1, in which the temperature for said airflow of step (a) is in the range of 120°–160° F. and the time period for said airflow is in the range of 50–90 minutes.

3. The method as in claim 1, in which said slurry is applied to said substrate in a manner to create a smooth uniform coating at all exposed surfaces.

4. The method as in claim 1, in which said slurry is thixotropic.

5. The method as in claim 1, in which said slurry is comprised of 40–50% silica and the remainder water.

6. The method as in claim 5, in which said slurry is comprised of 40–50% silica, up to 3% clay, and the remainder water.

7. The method as in claim 1, in which said coating has a variable thickness gradient ranging between ⅛–1/16 inch.

8. The method as in claim 1, in which the foam pattern assemblies are comprised of a microwave transparent material.

9. The method as in claim 8, in which said microwave transparent material is comprised of polystyrene expanded foam and glue.

10. The method as in claim 1, in which hidden internal surfaces of said said foam pattern assemblies comprise tunnels or internal chambers not readily exposed to airflow about the exterior of said pattern assembly.

11. The method as in claim 1, in which the low energy level for said microwave is controlled to (i) provide 0.9–2.0 kilowatts per 64 cubic feet of oven space, and (ii) remove less than 0.5 kilograms of water per foam pattern assembly.

12. The method as in claim 11, in which the time period during which said pattern assemblies are subjected to said microwaves is in the range of 6–15 minutes.

13. The method as in claim 1, in which the time period during which said coated assembly is subjected to said warm airflow is in the range of 50–90 minutes.

14. The method as in claim 1, in which said convective airflow is at a surface velocity across said pattern of about 200 feet per minute.

15. A method of dehydrating polystyrene foam pattern assemblies coated with a water based ceramic slurry in a thickness range of 0.031–0.120 inches, said pattern assemblies having hidden internal surfaces, the method comprising:

(a) subjecting said coated assembly to a single cycle of convective airflow at a temperature and time sufficient to dehydrate at least 60% of the vaporizable content of said coating at a temperature below that at which the substrate is thermally affected; and (b) thereafter subjecting said partially dehydrated coated assembly to microwave energy to substantially remove the remainder of said vaporizable content in the coating in a manner to avoid nonuniformity in the smoothness of the coating.

16. The method as in claim 1, in which said dehydration of step (a) is carried out so that there is no greater than 0.4 pounds of water per coated assembly at the completion of such step.

* * * * *